O. V. HONSTEDT.
TREE PROTECTING APPARATUS.
APPLICATION FILED FEB. 13, 1919.
1,351,249.
Patented Aug. 31, 1920.
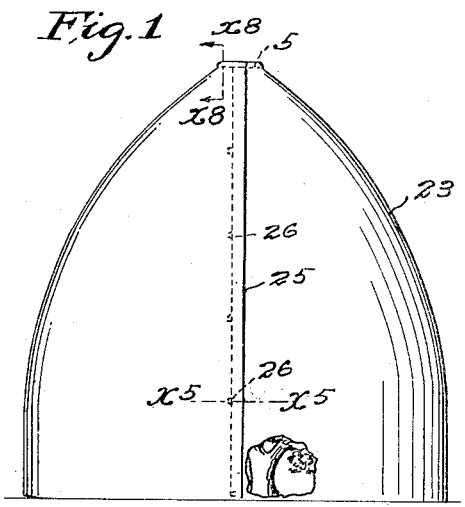
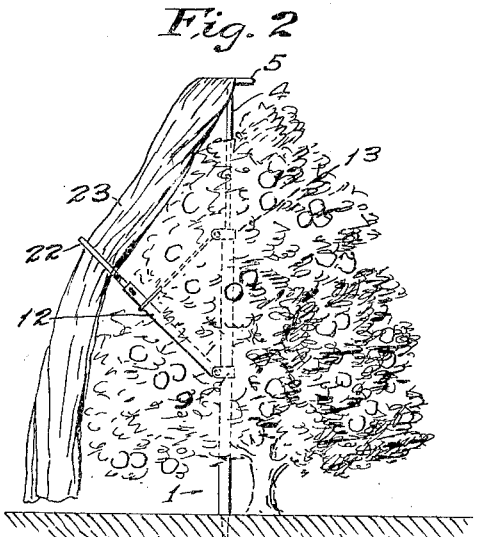
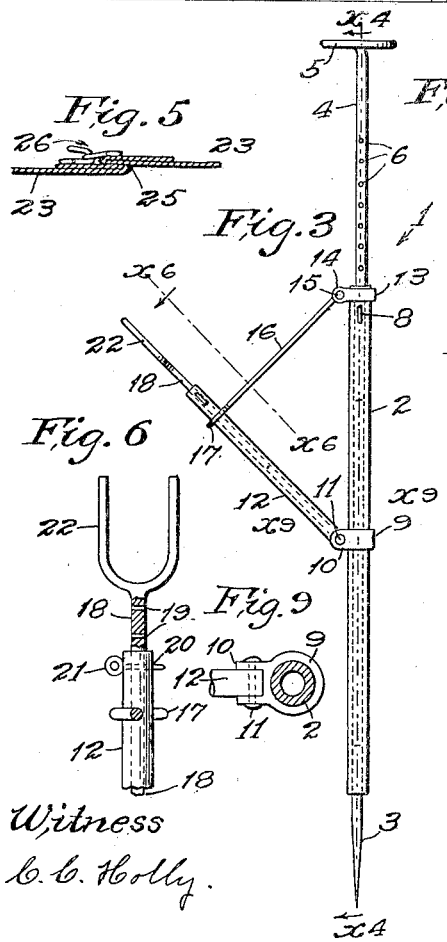
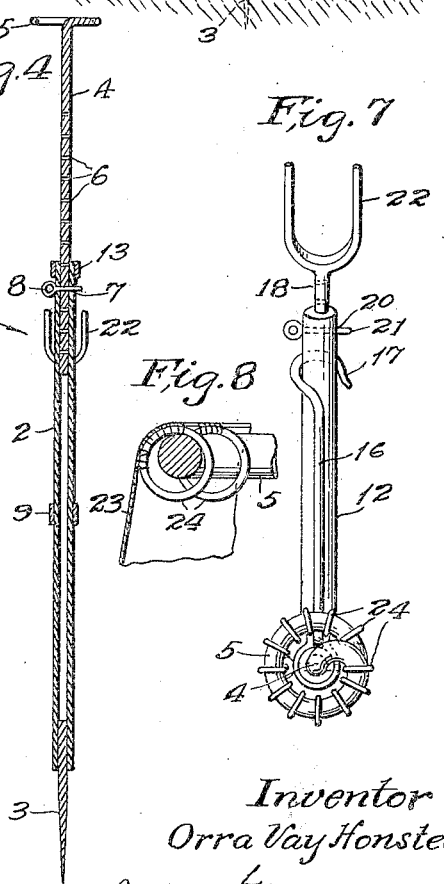
Witness
C. C. Holly.
Inventor
Orra Vay Honstedt
by James R. Townsend
his atty.

UNITED STATES PATENT OFFICE.

ORRA VAY HONSTEDT, OF UPLAND, CALIFORNIA.

TREE-PROTECTING APPARATUS.

1,351,249.   Specification of Letters Patent.   Patented Aug. 31, 1920.

Application filed February 13, 1919. Serial No. 276,858.

*To all whom it may concern:*

Be it known that I, ORRA VAY HONSTEDT, a citizen of the United States, residing at Upland, in the county of San Bernardino and State of California, have invented a new and useful Improvement in Tree-Protecting Apparatus, of which the following is a specification.

My invention relates to improvements in tree protecting apparatus, and consists in the provision of the new and useful features and the improved construction, arrangement and combination of parts, the purpose of which will be apparent to those skilled in the art from a consideration of the preferred form of structure herein shown, described and claimed.

The principal object of my invention is to provide a means for thoroughly protecting trees from the cold; and while it is especially designed for protecting perennial or evergreen trees, orange, lemon and other citrus trees, from the frost or low, chilly temperatures, it is not limited to that use.

It is well known that a very slight covering over deciduous fruit trees, in zones of low temperatures will protect the fruit buds from winter killing; and my device is designed to protect such trees from such injury.

The need of such a device is well known, and great effort has heretofore been made to supply this need; but the apparatus in use has been either ineffective to accomplish the desired result, or has been too expensive to be employed generally.

Many of the methods heretofore employed for this purpose have been the cause of permanent injury to the trees, especially the method commonly called "smudging;" which process, while operating to shield the fruit from light frost, incases the leaves of the tree in a thin coating of oily carbon soot which has an exceedingly injurious effect on the trees unless immediately removed, which is not always possible. This "smudging" process is also uncertain and costly.

In the use of my invention it is impossible to injure the tree, the uncertainty of results is eliminated and the cost of installation trivial in comparison with the results obtained.

Other objects, advantages and features of invention may appear from the accompanying drawing, the detailed description and the appended claims.

The accompanying drawing illustrates the invention.

Figure 1 is a side elevation of the apparatus in use inclosing a tree, a part of the canvas being broken away to show a small portion of the tree trunk.

Fig. 2 is a side elevation of the apparatus showing the canvas cover folded back in its position when not in use.

Fig. 3 is a side elevation of the frame with the canvas cover and supporting rings removed.

Fig. 4 is a section taken on the line $x^4$—$x^4$ Fig. 3.

Fig. 5 is a section taken on the line $x^5$—$x^5$ Fig. 1.

Fig. 6 is a section taken on the line $x^6$—$x^6$ Fig. 3.

Fig. 7 is a plan view of the frame with the canvas supporting fork pointing in the same direction it would appear when looking at Fig. 4 in plan elevation, and showing the canvas removed but the supporting rings in position.

Fig. 8 is a section taken on the line $x^8$—$x^8$ Fig. 1, and showing a fragmentary portion of the canvas and ring support.

Fig. 9 is a fragmental plan section on line $x^9$ Figs. 3 and 4.

In detail, the frame 1 is preferably formed of the pipe 2 into the lower end of which is shrunk the sharpened steel spike 3 which is designed to be thrust into the ground close to the body of the tree when the apparatus is to be installed into use, as shown in Fig. 2.

Slidably fitted in the other end of the pipe 2 is the rod 4 its free end being bent at right angles with its body and coiled into the ring 5 concentric with its body.

The rod 4 is provided with a series of transverse perforations 6, and near the upper end of the pipe 2 is drilled the hole 7, with which the perforations 6 are adapted to register. By means of the pin 8 which is adapted to pass through the hole 7 and the perforations 6, the rod 4 is raised or lowered to lengthen or shorten the frame.

About midway of the pipe 2 is a ring 9 that is revolubly seated on the pipe, and from this ring are extended the lugs 10 to which is pivoted on the pin 11 one end of the pipe 12, which is provided with the telescoping rod 18 on the outer end of which is formed the fork 22 which is adapted to hold the canvas 23 when it is desired to hold it back from the tree. The hole 20 in the pipe 12 and the holes 19 in the rod 18 allow the rod to be secured by means of the pin 21 to shorten or lengthen the arm formed of the said pipe and rod.

At the upper end of the pipe 2 is the ring 13 secured similar to the ring 9, to the lugs 14 of which the rod 16 is pivoted by the pivot 15. The outer end of this rod is formed into the hook 17 adapted to engage and support the pipe 12 in the position shown in Figs. 2, 3, 4 and 7, when the canvas is folded into the fork 22.

The canvas 23 is similar to that of an ordinary tent except that its narrowed top portion is secured to a plurality of rings 24 adapted to be mounted on the standard ring 5, as shown in Figs. 1, 2, 7 and 8.

As shown in Figs. 1 and 5, the canvas 23 is open from top to bottom at 25, the edges of the opening being provided with the hooks and eyes 26 by means of which the edges may be secured to close the canvas around a tree.

I have designated canvas as the preferred material for the cover 23, but other material may be used, to reduce the cost or to increase the protection without departing from the spirit of my invention.

In operation, the device is erected by moving the frame 1 to a position close to the body of a tree, which may be easily accomplished by pushing aside any impeding limbs, and then inserting the spike 3 firmly in the ground. The rod 4 is then adjusted to bring the top of the canvas slightly above the top of the tree and the canvas drawn around in an enveloping position and the edges secured together, as shown in Fig. 1.

In thus inclosing a tree a considerable space of ground will be inclosed, and from both tree and ground considerable heat will radiate raising the temperature, such heat being absorbed during the day when the canvas is open and folded in the fork, as shown in Fig. 2; the tree being covered only at night when the danger of frost is the greatest.

It is to be understood that my invention is not limited to protection from cold or frost, as it may also be used for protection against destructive wind, or by use of a very thin cover of gauze or other light material, to protect the tree from the attacks of insects or birds.

By the use of my apparatus, orange, lemon, grape-fruit and similar trees may be protected against outside temperature as low at twenty degrees above zero.

When used for deciduous trees it is installed before the extreme cold endangers the young buds and kept in place until all danger is passed, opening the cover at times to allow the sun and rain to get to the trees.

I claim—

1. In a tree protector, a standard adapted to be adjusted to different heights; means on the upper end of said standard for supporting in either open or closed position a tree covering fabric; an arm pivotally mounted on said standard; adjustable means for retaining said arm at an angle from said standard; and means on the outer end of said arm for retaining the tree covering fabric in a non-covering position.

2. In a tree protector, the combination of a standard adapted for insertion in the ground near a tree in vertical position; means for adjusting said standard to different heights; a tree covering fabric secured to the upper end of said standard; means for adjusting said fabric to enveloping or non-covering position relative to the tree; an arm pivotally mounted on said standard; means for adjusting the length of said arm; means for adjusting and retaining said arm at an angle in relation to said standard; and means on the outer end of said arm for retaining the tree covering fabric in a non-covering position.

3. In a tree protector, the combination of a standard adapted for insertion in the ground near a tree in vertical position; a tree covering fabric secured to the upper end of said standard; means for adjusting said fabric to enveloping or non-covering position relative to the tree; an arm pivotally mounted on said standard; means for adjusting and retaining said arm at an angle relative to said standard; and means on the outer end of said arm for retaining the tree covering in a non-covering position.

4. A tree protector comprising an adjustable standard; means for inserting said standard in the ground; an arm foldably attached to said standard and adapted to be extended radially from said standard; prongs on said arm; radially movable means on top of said standard; a tent cover attached to said radially movable means for securing said tent cover to inclose a tree.

5. In a tree protector, a telescopically extensible standard the lower end of which is sharpened to adapt it to enter the ground and the upper end of which is extended laterally at right angles and formed into a convoluted hook; a telescopically extensible arm on the standard and radially and vertically movable thereon; prongs on said arm; holding means on the standard adapted to hold said arm at an angle to the standard; a tent cover; rings attached to the tent cover adapted to be slipped onto the convoluted hook at the top of the standard; and means for securing said cover around a tree to protect it.

In testimony whereof, I have hereunto set my hand at Los Angeles, California, this 5th day of February, 1919.

ORRA VAY HONSTEDT.

Witness:
W. M. GENTLE.